United States Patent [19]

Taylor

[11] Patent Number: 4,922,950
[45] Date of Patent: May 8, 1990

[54] UNITIZED DISC FLOW CONTROL ASSEMBLY FOR A RESTRICTOR VALVE

[76] Inventor: Julian S. Taylor, 8300 SW. 8, Oklahoma City, Okla. 73128

[21] Appl. No.: 303,434

[22] Filed: Jan. 30, 1989

[51] Int. Cl.⁵ .............................................. F16K 27/06
[52] U.S. Cl. .................................. 137/316; 137/454.6; 137/625.31
[58] Field of Search .................. 137/316, 454.5, 454.6, 137/625.31; 251/312

[56] References Cited

U.S. PATENT DOCUMENTS

| | | | |
|---|---|---|---|
| 3,232,579 | 2/1966 | Jeffrey | 251/312 |
| 3,376,887 | 4/1968 | Boteler | 137/316 |
| 3,563,512 | 2/1971 | Hauffe | 251/312 |
| 3,831,621 | 8/1974 | Anthony et al. | 137/625.31 X |
| 4,651,770 | 3/1987 | Denham et al. | 137/454.5 X |
| 4,678,002 | 7/1987 | Valley | 137/454.5 X |
| 4,738,277 | 4/1988 | Thomas | 137/625.31 X |

*Primary Examiner*—Stephen M. Hepperle
*Attorney, Agent, or Firm*—Robert K. Rhea

[57] ABSTRACT

In a multiple orifice body fluid flow restrictor valve having a flow passageway between its ports opened and closed by superposed multiple orifice discs controlled by a yoke connected with one of the discs and having a yoke stem projecting outwardly of the valve body through a valve body top a sleeve cage loosely nested by a valve body counterbore intersects the passageway and surrounds the yoke and discs. The valve body top and sleeve cage forms a unit easily removed from and reinserted into the valve body for repair or replacement of worn valve components without disconnecting the valve from a flow line. The sleeve cage is releasably secured to the valve top in a manner permitting angular rotation of the valve top relative to the valve body and sleeve cage while the latter is nonrotatably secured within the valve body in an axially slidable manner relative to the valve body while threadedly connecting or releasing the valve body top to or from the valve body.

3 Claims, 2 Drawing Sheets

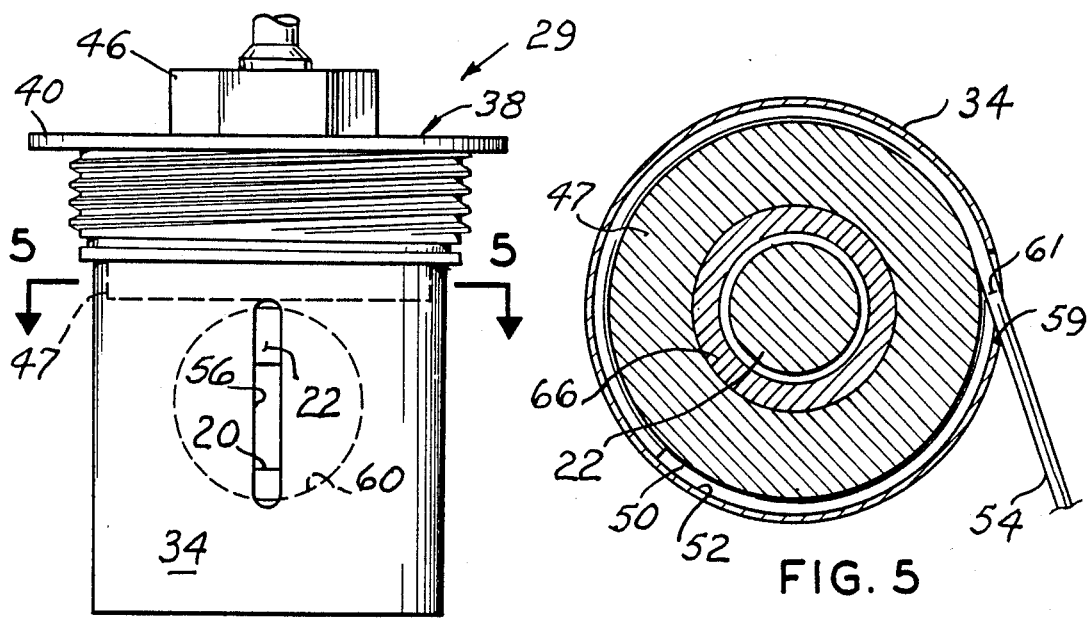
FIG. 2
FIG. 5
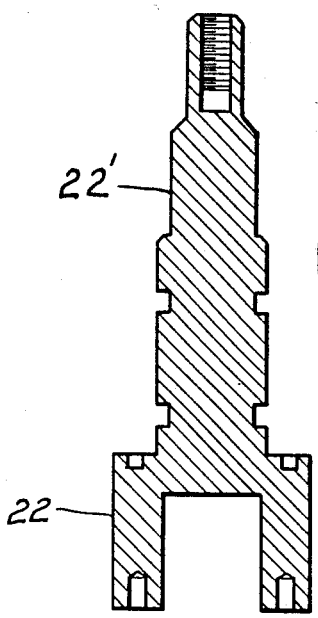
FIG. 6
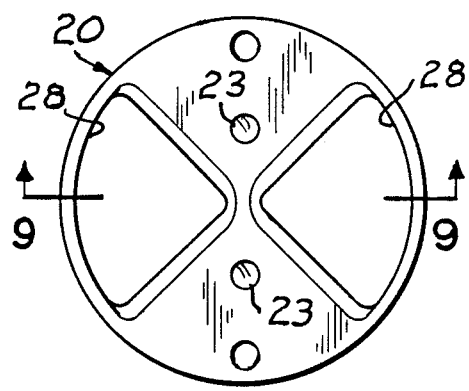
FIG. 8
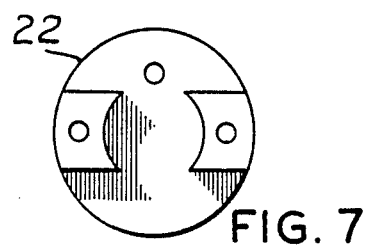
FIG. 7
FIG. 9

UNITIZED DISC FLOW CONTROL ASSEMBLY FOR A RESTRICTOR VALVE

BACKGROUND OF THE INVENTION

1. Field of the invention.

The present invention relates to fluid flow control valves of the multiple orifice type and more particularly to a unitized assembly of valve flow control discs and components.

Flow restrictor valves, utilizing a pair of discs having mating and mismating multiple orifices for restricting the flow rate through the valve, are highly satisfactory and in general use. When the discs must be replaced, as a result of being worn by fluid contained abrasive, it has been necessary to stop the fluid flow through the valve both upstream and downstream in order to remove the valve body from its connection with the flow line in order to disassemble the valve components and replace worn discs. This has been a time consuming process as well as an economic loss due to the interruption of fluid flow.

This invention eliminates the necessity of removing the valve body from the line to replace the control flow discs by unitizing the discs and their supporting components which may be manually removed from and inserted into the valve body as a unit.

2. Description of the prior art.

I do not know of any patents disclosing the feature of providing a replaceable unitized disc control flow assembly for a restrictor valve body.

SUMMARY OF THE INVENTION

A flow restrictor valve, having an elongated centrally bored and counterbored body for forming a fluid port at one end and receiving flow control discs in the counterbore, is provided with a lateral or right angular port forming a fluid passageway across the position of the mated or mismated flow control discs. The discs are axially disposed in one end of a sleeve-like cage having a wall port in register with the lateral port. A centrally bored wrench flat equipped valve top is threadedly secured with the valve body in the outward end portion of its counterbore. The valve top axially supports a yoke pinned to the rotatable flow control disc. During assembly of the flow control unit, the valve top is rotatably inserted in and joined to the adjacent end portion of the sleeve cage wall by a wire retainer within cooperating semicircular grooves in the overlapped portion of the valve top and sleeve wall. An index pin projecting through the body wall is longitudinally slidably received by a longitudinal slot in the sleeve cage wall which prevents angular rotation of the sleeve cage relative to the valve body but permits angular rotation of the valve top when threadedly connecting or disconnecting it from the body counterbore. An indexed position control handle overlying the valve top, is secured to the end portion of the yoke stem projecting through the valve top.

The principal object of this invention is to provide a unitized assembly of components controlling the mated and mismated position of flow restrictor discs in a valve body which may be inserted into and removed from the valve body as a unit.

BRIEF DESCRIPTION OF THE DRAWINGS

FIG. 2 is an elevational view of the unitized valve assembly as viewed from the left as it appears in FIG. 1;

FIG. 5 is a horizontal cross sectional view taken substantially along the line 5—5 of FIG. 2, illustrating the manner of inserting or removing the connecting wire retainer;

FIG. 6 is a vertical cross sectional view of the disc controlling yoke, per se;

FIG. 7 is a bottom view of FIG. 6;

FIG. 8 is a top view of the rotatable disc, per se; and.

FIG. 9 is a vertical cross sectional view taken substantially along the line 9—9 of FIG. 8.

DESCRIPTION OF THE PREFERRED EMBODIMENTS

Figure 1:
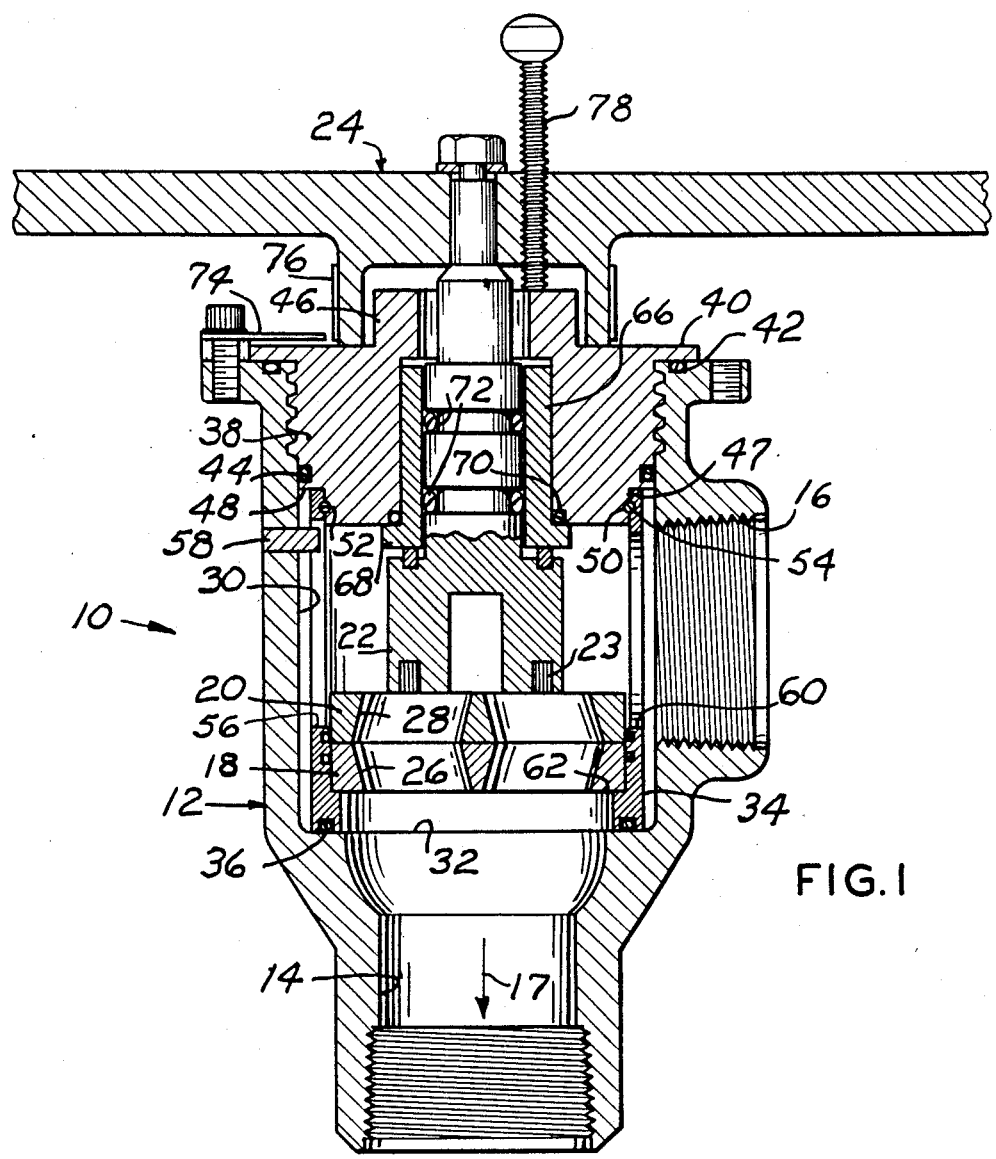
FIG. 1 is a vertical cross sectional view of the valve.
Figure 4:
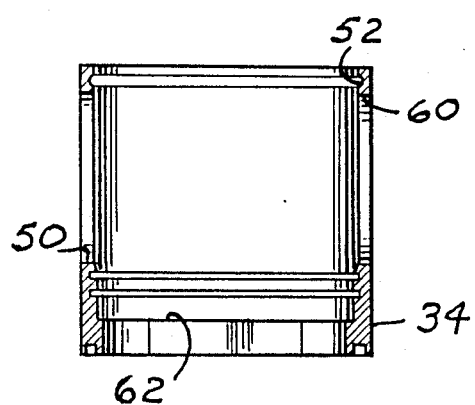
FIG. 4 is a vertical cross sectional view taken substantially along the line 4—4 of FIG. 3.

Like characters of reference designate like parts in those figures of the drawings in which they occur.

In the drawings:

The reference numeral 10 indicates a flow restrictor valve having a valve body 12 commonly referred to as "right angle valve" characterized by a first inline flow port 14 and its second flow port 16 disposed intermediate the length of the body 12 with its axis normal to the first port 14 and forming a fluid passageway with flow assumed to be in the direction of the arrow 17. This restrictor valve is characterized by mating and mismating discs 18 and 20 disposed in contiguous face to face contact axially of the flow port 14. A yoke 22, secured by pins 23 to the disc 20, includes a stem portion 22' which projects axially outwardly of the valve body for receiving a control handle 24 for angularly rotating the disc 20 relative to the disc 18 for mating or mismating the disc ports 26 and 28 in a conventional manner. The above description is substantially conventional with right angular flow restrictor valves and is set forth to show the combination of valve components which are unitized, as at 29 (FIG. 2), in this invention as will now be explained.

The valve body top or head end, as viewed in FIG. 1, is provided with an outstanding annular flange and is counterbored opposite the port 14, as at 30, forming an annular shoulder 32 facing upstream and spaced downstream beyond the downstream limit of the lateral port 16. The counterbore 30 loosely receives axially a sleeve cage 34 having one end sealed with the shoulder 32 by an O-ring 36. The other end of the sleeve 34 terminates in a downstream direction beyond the limit of the lateral port 16 intersection with the counterbore 30 and in spaced relation with respect to the head end of the valve body. The valve body head end is internally threaded for threadedly receiving a valve top 38 having an annular flange 40 overlying the valve head end and sealed therewith by an O-ring 42 with a peripheral O-ring 44 sealing the valve top at the inner limit of the threads. The valve top 38 is further provided with an axial diametrically reduced extension 46 having external wrench flats for removing the top 38, as presently explained.

The top 38 is further diametrically reduced at its inward end, as at 47, for entering the upper end portion of the sleeve 34, as viewed in FIG. 1, and forming a shoulder 48 abutting the adjacent end thereof. The reduced end portion 47 of the top is provided with a circumferential semicircular, in toric cross section, groove 50 and the inner periphery of the top end portion of the sleeve 34 is similarly provided with a semicircular cooperating groove forming an annular void circular in transverse toric cross section between the top and sleeve for nesting a length of malleable wire 54 in the manner presently explained.

The mating tolerance between the top 38 and adjacent end of the sleeve 34 and wire 54 contained therebetween is such that the top 38 may be angularly rotated relative to the sleeve 34 for the purpose presently explained.

As shown by FIG. 2, the sleeve 34 is provided with a vertical wall slot 56 between its respective ends for slidably receiving a sleeve index pin 58 projecting inwardly through the valve body wall and terminating in close outward spaced relation with respect to the cylindrical plane of the inner surface of the sleeve when the latter is concentrically disposed within the valve body counterbore 30. When the valve top 38 is fully engaged with the valve body the index pin 58 is adjacent the upper limit of the sleeve slot 56 and the length of the slot 56 is such that the valve top 38 may be threadedly unscrewed from the valve body which progressively lifts the sleeve in an upward direction until the valve top 38 is separated from the valve body threads. The looseness or annulus between the counterbore 30 and the outside diameter of the sleeve 34 is such that when the valve top is released from the valve body, the unit 29 comprising the valve top, the sleeve and contained components may be moved laterally toward the port 16, so that the index pin 58 is removed from the confines of the sleeve slot 56. The unit 29 may then be moved in an axial direction out of the valve body and later similarly reinserted as presently explained.

Obviously, the sleeve 34 is provided with a lateral bore 60 cooperatively concentric with the axis of the port 16 and is maintained in this position by the index pin 58.

The sleeve 34 is assembled to the valve top 38 prior to insertion into the valve body by manually positioning the top 38 in the sleeve to align the semicircular grooves 50 and 52. As illustrated by FIG. 5, the wall of the liner is provided with a recess 59 open to its top end and intersecting the liner groove 52. One end of the wire 54 is manually inserted through the recess 59 in a tangential direction relative to the inner periphery of the sleeve and adjacent portion of the top 38. As the wire 54 is manually inserted it is deformed in a circular direction by sliding along the confines of the mating grooves until its inserted end is visible in the recess 59. The wire 54 is then cut off adjacent one side of the recess as indicated by the dash line 61.

Figure 3:
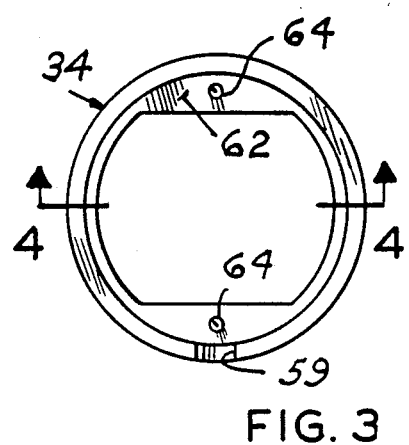
FIG. 3 is a top view of the sleeve cage, per se.

The downstream end of the sleeve 34 is provided with an annular upstream facing shoulder 62 which supports the disc 18 and is secured thereto by dowel-like pins 64 (FIG. 3). The two discs 18 and 20 are sealed with the inner wall surface of the sleeve by O-rings in a conventional manner.

The valve top 38 is axially bored and counterbored from its internal end for receiving the outwardly projecting stem 22′ end of the yoke 22 and a yoke stem sleeve 66 having an inward annular outstanding flange 68 abutting the inner end limit of the valve top 38 and sealed therewith by an O-ring 70. The flange 68 is pinned to the yoke at its juncture with its stem for angular rotation therewith by the handle 24 secured to the outwardly projecting end of the yoke stem. Other seals 72 seal the yoke stem periphery with the stem sleeve.

An index guide 74, mounted on the valve body flanged end, cooperates with indicia or indexing means 76 circumferentially secured to the hub of the handle for visually indicating the mated or mismated position of the disc 20 relative to the disc 18.

A thumb screw 78 threadedly projects through the handle 24 and engages the top surface of the wrench flat portion 46 to prevent accidental angular rotation of the handle and insure a selected position of the disc openings 28 relative to the disc openings 26 permitting a desired flow rate through the valve.

OPERATION

In operation, assuming the valve components of the unit 29 are installed in an operative position, as illustrated by FIG. 1, when it is evident that one or both of the discs 18 or 20 must be replaced as a result of abrasive fluid wear fluid flow through the passageway is discontinued. The thumb screw 78, handle 24 and indexed 74 are removed from the valve top 38. The valve top is then removed from the valve body 12 in an unscrewing action wherein the sleeve 34 remains stationary, held by the index pin 58. When the valve top threads are separated from the body threads, the unit 29 is manually moved laterally toward the inlet port 16 until the index pin 58 is free of the sleeve slot 56 which permits the valve top and the sleeve to be removed from the valve body. Thereafter a replacement or new unitized valve assembly 29, as described hereinabove, may be inserted into the valve body by manually positioning the sleeve 34 against the wall of the counterbore 30 at the position of the inlet port 16 moving the sleeve toward the port 14 until the index pin 58 may enter the sleeve slot 56 permitting the sleeve to be coaxially disposed with the outlet 14 and the top threads engaged with the valve body threads. Thereafter the top is tightened with the valve body wherein the sleeve is maintained stationary relative to the valve body by the index pin 58, while the top 38 is angularly rotated in a thread tightening direction.

Alternatively, the discs 18 and 20 may be replaced in the original unitized assembly by removing the wire 54 from the cooperating groove connecting the liner to the valve top by grasping the visible end of the wire 54 and removing it from the cooperating grooves 50 and 52 in a sliding action relative to the valve top and sleeve 34 thus permitting removal of the yoke 22 and discs 18 and 20 from the sleeve 34. New discs are then installed and the repaired unit installed as described hereinabove.

Obviously the invention is susceptible to changes or alterations without defeating its practicability. Therefore, I do not wish to be confined to the preferred embodiment shown in the drawings and described herein.

I claim:

1. In a flow restrictor multiple orifice valve having its body counterbored opposite one valve port defining an annular outwardly facing shoulder for receiving superposed multiple orifice discs adjacent the shoulder in face to face axial alignment with said one port, said body having a lateral port communicating with the counterbore, the improvement comprising:

cage means including a sleeve loosely disposed in the counterbore and normally sealing with said annular shoulder and surrounding said discs, said sleeve having a wall port in axial alignment with the lateral port and having an elongated wall slot normal to and opposite the wall port;

inwardly projecting guide means on the body slidably received by the sleeve slot for preventing angular rotation of the sleeve relative to the valve body;

yoke means axially connected with the disc opposite said one port and having a yoke stem projecting beyond said valve body at the outer end of the counterbore for angular rotation of one disc relative to the other disc;

valve top means threadedly connected with said valve body at the outward end portion of the counterbore and surrounding the yoke stem, said valve top means having a diametrically reduced inner end portion entering and slidably surrounded by the adjacent end portion of said sleeve; and, means joining said sleeve with said valve top means permitting angular rotation of said valve top means relative to said sleeve.

2. The combination according to claim 1 in which the outer surface of the reduced end portion of said valve top means and the surrounding inner surface of the sleeve are provided with cooperating annular grooves and further including:

an elongated strand nested by the cooperating grooves.

3. In a multiple orifice disc flow restricting right angle valve having its body counterbored opposite one valve inlet port defining an annular downstream facing shoulder, said body having a lateral port communicating with the counterbore to complete a flow passageway, the improvement comprising:

valve top and sleeve cage means, including cooperating multiple orifice flow control discs, axially inserted as a unit into and closing said counterbore and sealing with the annular shoulder for controlling the volume of fluid through the passageway, and, strand means separably joining said sleeve cage means to the valve top.

* * * * *